May 25, 1926. 1,586,385
E. L. A. SAVY
METHOD AND APPARATUS FOR COATING CONFECTIONS
Filed March 20, 1925   3 Sheets-Sheet 1

INVENTOR.
Emile L. A. Savy
BY Chapin + Neal
ATTORNEYS.

May 25, 1926.

E. L. A. SAVY 1,586,385

METHOD AND APPARATUS FOR COATING CONFECTIONS

Filed March 20, 1925   3 Sheets-Sheet 3

Fig. 3.

INVENTOR.
Emile L. A. Savy
BY Chapin & Neal
ATTORNEYS.

Patented May 25, 1926.

1,586,385

UNITED STATES PATENT OFFICE.

EMILE LOUIS ALFRED SAVY, OF COURBEVOIE, FRANCE.

METHOD AND APPARATUS FOR COATING CONFECTIONS.

Application filed March 20, 1925. Serial No. 17,059.

This invention relates to the coating of confections, as effected automatically in a confection coating machine. More particularly, it relates to a method of treating the chocolate coating during its travel through the machine and to an apparatus for practicing the method.

The invention is adapted primarily to that type of coating machine in which the chocolate is flooded over the articles while carried by a pervious support and in which the excess chocolate, not used for coating, passes through said support and is collected and elevated to a point where it can be subsequently delivered upon the articles. In machines of this type, the chocolate supply tank, in which the coating is kept thoroughly mixed and at the desired temperature, is located below the pervious confection support and coating therefrom is elevated and delivered to a shower pan located above said support. From this pan a stream of coating issues and falls by gravity to envelop the confections on the pervious support, which is usually a travelling wire mesh conveyer. The excess coating, passing through the latter, falls directly into the supply tank.

A disadvantage of this prior practice is that the conditioned coating in the supply tank has to travel through a considerable distance before being applied to the goods and there is a considerable time interval during which the chocolate may lose some of the effects of the conditioning operation. For example, it may not retain precisely the correct temperature and be of the proper consistency. Moreover, the chocolate, which is a mixture of finely divided solids with a cocoa butter content which is readily liquefiable, may separate to some degree into its respective constituents and lose its homogeneous nature. Particularly, the cocoa butter will readily separate from the other constituents and it is most important not to have this occur as it means a loss of the brilliant gloss and lustre in the coatings of the confections.

This invention starts with the idea of applying the chocolate to the confections as directly and as quickly as possible and for this purpose the chocolate supply tank is located above the pervious confection support, rather than below it, as in prior practice. The conditioned coating can accordingly be delivered directly and quickly upon the articles, as by gravity flow, from the tank, and consequently the confections will be coated with chocolate having the desired characteristics. The chocolate, not used for coating the articles, passes through the confection support and is collected and elevated to the supply tank for reconditioning.

A principal object of this invention consists in the method of, and apparatus for, treating that portion of the chocolate which passes through the pervious confection support with the end in view of preventing, as far as possible, a separation of the cocoa butter content of the chocolate mixture during its travel back to the supply tank. Such separation is prevented in the tank by continual mixing but while the chocolate is out of the tank and traversing its path back to the latter the separation is liable to occur.

More particularly, I avoid separation of the cocoa butter during the described time by chilling the chocolate mixture to an extent sufficient to prevent the cocoa butter from separating. That is, the chocolate falling through the pervious conveyer is lowered in temperature until it will just barely continue to flow. While the chocolate is still fluid, is it thicker in consistency and somewhat sluggish in flow. The cocoa butter is probably solidified and therefore cannot separate from the other constituents.

Another feature of the invention results from the fact that the chocolate has imparted thereto, during its cycle of travel through the machine, two different temperatures one of which is above the normal melting point and the other slightly below such point, whereby I am enabled to utilize what I call the phenomenon of surfusion which results in improved gloss and lustre in the applied coatings. Whatever the theory may be, I have found that this result is obtained when a body of chocolate is chilled a few degrees below its normal coating temperature and subsequently mixed with a body of warmer chocolate at or around said normal temperature.

The invention will be disclosed with reference to the accompanying drawings, in which:—

Fig. 3 is a cross sectional view thereof.

Figure 2:
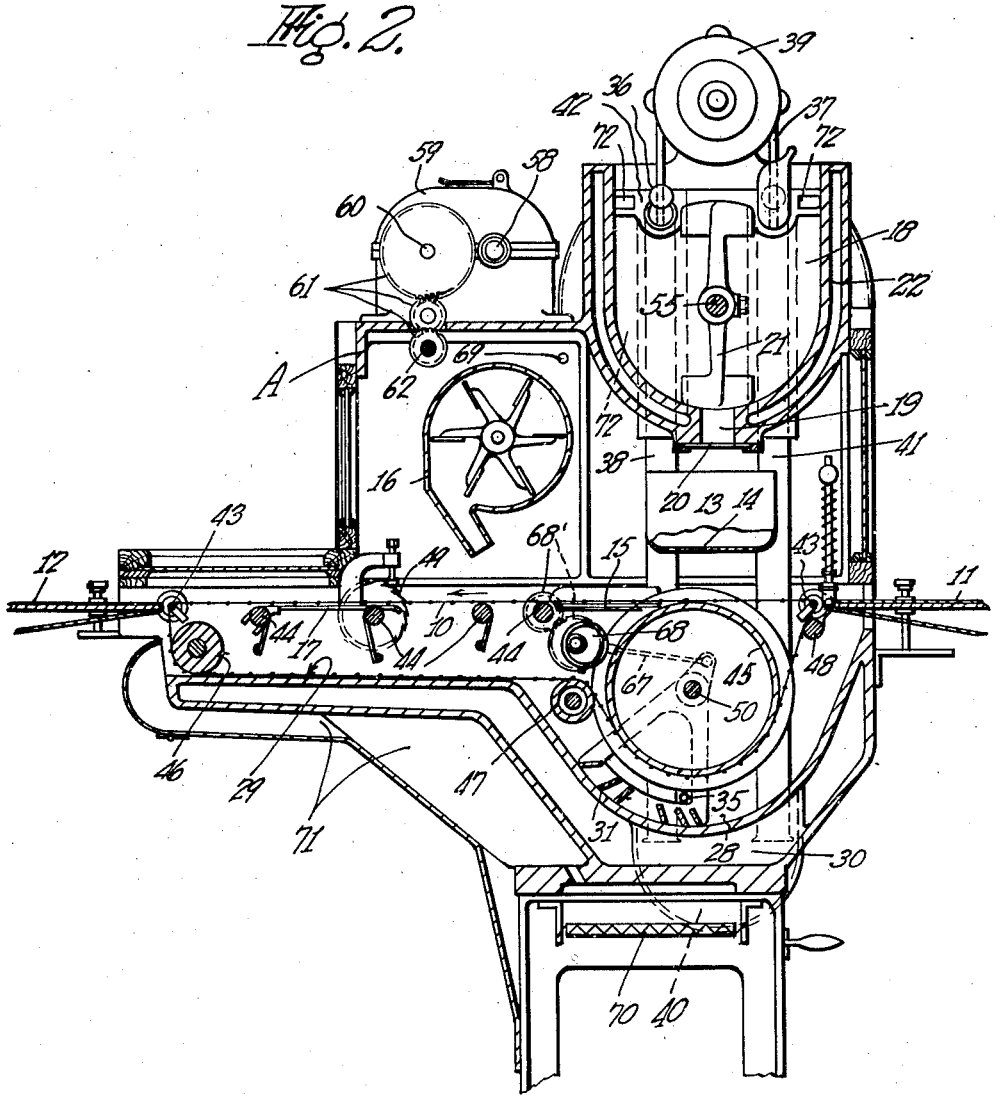
Fig. 2 is a sectional elevational view thereof.

Referring to these drawings and particularly to Fig. 2; the machine includes a frame or casing A through which a pervious confection support, such as a wire mesh conveyer 10, is arranged to travel horizontally in the customary manner. The confections to be coated are supplied to conveyer 10 by a feed belt 11 and the coated confections are delivered by conveyer 10 onto a delivery belt 12. Above the conveyer is a shower pan 13, having an outlet 14 through which a stream of chocolate contained in the pan may flow and envelop the articles passing therebelow on conveyer 10. A bottom coating is applied by a thin plate 15 underlying conveyer 10, on which plate a stream of chocolate is maintained. A fan 16 delivers a blast of air upon the coated confections to remove excess coating and a rapping frame 17 agitates the conveyer and thereby vibrates the coated confections to smooth out any wrinkles in the coating which may result from the action of the fan. The elements, as thus far described, are substantially the usual ones and the coating operation is performed in the usual manner.

A distinctive feature of this machine consists in the particular location of the main chocolate supply tank, in which the coating is maintained thoroughly mixed and at proper temperature. This tank, shown at 18, is located above the conveyer 10 and so that the conditioned coating may flow by gravity therefrom upon the articles travelling therebeneath and the interval between the time when the conditioned coating leaves the tank and the time when it is applied to the articles is very short, whereby the coating does not have time to materially change in its essential characteristics before it is applied to the articles. The articles may thus be covered with coating applied under almost ideal conditions and the resulting work is better than that effected by prior machines of this general type.

As shown, the outlet 19 of the supply tank is located immediately above the open upper end of shower pan 13 and the latter is merely used as an intermediary to distribute the coating or convert the central stream issuing from outlet 19 into the wide, thin stream necessary to traverse conveyer 10. Except for its distributing function the pan 13 might be omitted. The action, so far as direct delivery of coating upon the goods is concerned, is hardly any different whether the pan is used or not because the flow from tank 18 may be regulated by a valve 20 to deliver chocolate at substantially the rate at which it is consumed and the time interval necessary for the coating to pass from outlet 19 to the confections to be coated is not substantially different. The pan 13 simply spreads and distributes the chocolate and does not materially slow up the flow, which in any event occurs in a very short interval, too short for any substantial change in the characteristics of the conditioned coating.

The conditioning of the coating is effected in tank 18 partly by the action of revoluble mixing paddles 21 which not only keep the chocolate in the tank thoroughly mixed but also rapidly mix the incoming chocolate with that already there and cause the contents to be kept as nearly as possible in the form of a homogeneous mixture at all times. The conditioning also includes a heating effect and, to this end, the tank is provided with a jacket 22 to receive a heating fluid, such as hot water for example. By the heating jacket the chocolate in tank 18 is maintained within very close limits at a predetermined temperature, being that best calculated with any given chocolate mixture to produce the best results. The cocoa butter content is melted and, being kept mixed with the other constituents, produces a very fluid mixture and one which produces glossy, lustrous coatings. Since chocolate mixtures used for coating vary widely, the particular temperature chosen will vary somewhat. Generally speaking, the temperature of the chocolate in tank 18 is in the vicinity of 34° C.

Any suitable means may be employed for keeping the chocolate at the desired predetermined temperature. As an illustrative example of one such means, I have shown, in conventional form, an electric heating element 23 immersed in the water in jacket 22. The terminals of this element 23 are connected by wires 24 and 25, through the intermediary of a thermostatically operated switch 26, to a suitable source of electricity. The switch 26 is operated by a thermostat 27 of the Bourdon tube type, the sensitive element 27' of which is immersed in the chocolate in tank 18. The arrangement is such that switch 26 will open and disconnect the electric heater whenever the chocolate in tank 18 exceeds a certain temperature. The practical result is that the chocolate is kept within very close limits at the required temperature.

As in prior machines, such of the coating as is not used for coating passes through the conveyer 10 but unlike prior machines it does not pass directly into the main supply tank although that is its ultimate destination. The floor of casing A is formed to provide a substantially semi-circular sump 28 into which the bulk of the excess coating directly passes, since the sump is located vertically beneath the shower pan. The drippings from the coated articles fall upon an inclined bottom floor 29 of casing A, which floor drains toward the sump. Desirably, since the chocolate as will appear, is rendered of sluggish fluidity, the return stretch of conveyer 10 is made to rub lightly on floor 29 to thereby aid in conveying the chocolate to the sump. The floor and sump are provided with a temperature controlling jacket 30 in which a fluid, such as water, maintained at a predetermined temperature, is received. By the jacket 30, the temperature of the chocolate is lowered several degrees below that in tank 18 and that chocolate falling in relatively small quantities on floor 29 is immediately chilled to an extent sufficient to solidify the cocoa butter content or at least to prevent it from separating from the remaining constituents of the coating mixture. The larger body of coating in sump 28 is likewise lowered in temperature for the same reason. Due to the larger volume of chocolate in sump 28, it is generally desirable to provide a stirrer, such as the oscillatory blades 31, which insure that the cocoa butter content is kept mixed with the other constituents until it can acquire the desired lower temperature. Also, the agitator insures that all portions of the chocolate in sump 28 will acquire the desired temperature. As above stated the exact temperature chosen will vary with the particular mixture chosen but in general this lower temperature is in the neighborhood of 28° C.

The means for maintaining the desired temperature condition in sump 28 may be varied, as desired. For illustration, I have shown an electric heating element 33 controlled by a thermostatically operated switch 34 and operating as above described in connection with the heating means for tank 18. In this case also, the sensitive element 35 of the thermostat is located in the chocolate in sump 28.

The chocolate may be elevated from sump 28 into the conditioning tank 18 by any suitable means. As an illustrative example, I have shown a pump consisting of a series of balls 36 fixed at spaced intervals to a cable 37 and travelling upwardly through a tube 38 in which they loosely fit. The cable 37 is trained over a pulley 39 and the lower loop of the cable lies in a drain pocket 40 at one side of the sump, as shown in Fig. 3. The balls 36 may also pass downwardly through a tube 41. Both tubes 38 and 41 are mounted in spaced parallel relation and are fixed in, and depend from, the tank 18 near one end thereof. The lower ends of tubes 38 and 41 may be bell-mouthed and their upper ends open into the upper part of tank 18 through an inclined ledge 42 down which the chocolate issuing from tube 39 may readily flow into tank 18.

The coating, having been chilled in sump 28, does not warm up sufficiently during its passage through tube 39 to allow the cocoa butter content to separate but, as soon as it enters the tank, it rapidly acquires the warmer temperature and the resulting fluidity and is quickly mixed by the paddles 21 with the main body of chocolate in the tank 18. The chilled chocolate is delivered into the tank in small volumes, in comparison to the volume of warmer coating already therein and is therefore capable of being reconditioned quickly.

Figure 1:
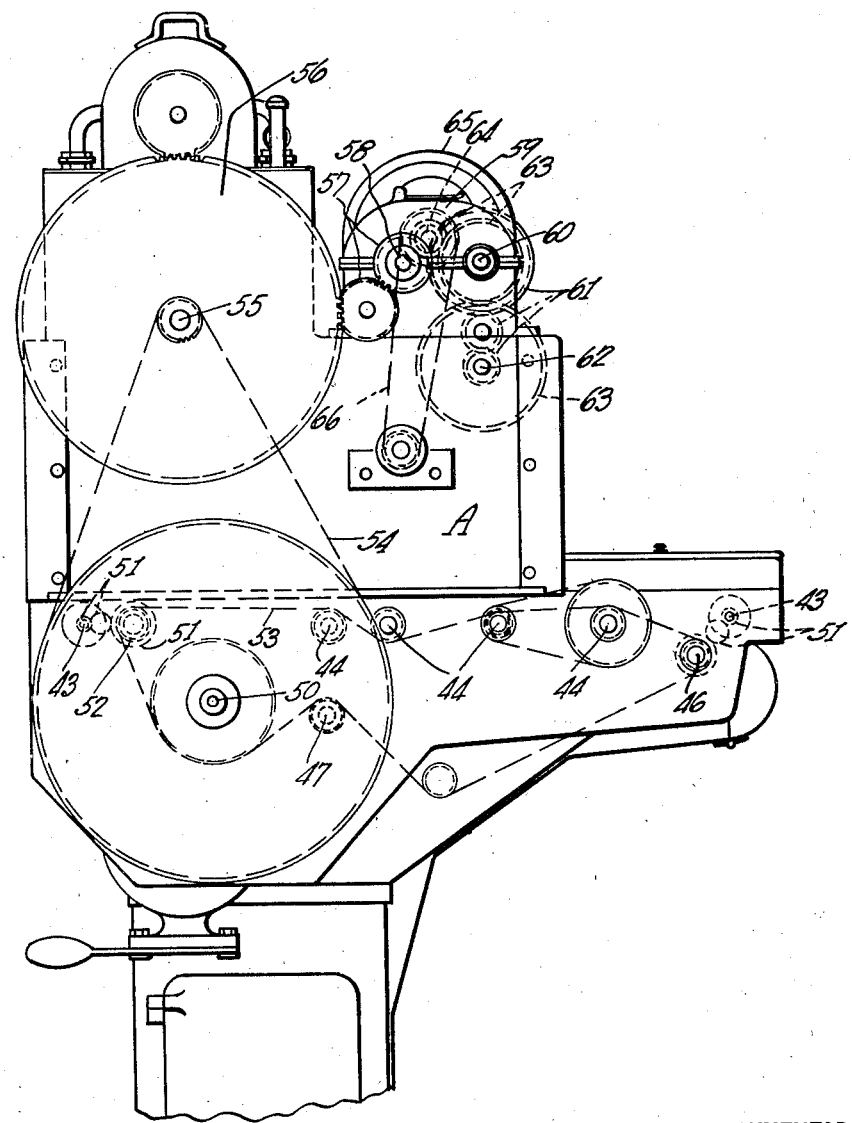
Fig. 1 is an exterior elevational view of a machine embodying my invention.

As to the details of the exemplary apparatus shown, the conveyer 10 is supported in its upper stretch by small end rolls 43 and a series of intermediate rolls 44, together with a larger roll 45 located in the sump. A driving roll 46 is provided for the conveyer together with idler and tension rolls 47 and 48 respectively. The rapping frame 17 is of well known form and is vibrated by ratchets 49 fixed on one of the rolls 44. The rolls 43, 44 and 47 and the shaft 50 of roll 45 are mounted near their ends in the side walls of casing A. As shown in Fig. 1, one roll 43 is driven by spur gearing 51 from an idler sprocket 52, and the other roll 43 is driven in a similar manner from a sprocket on roll 46. The other rolls 44, 45 and 47 all carry sprockets on their outer ends and all these sprockets as well as those above described are connected together by a chain 53. Shaft 50 is connected by a chain 54 and suitable sprockets to a shaft 55 on which the paddles 21 are fixed and this shaft is connected by spur gears 56 to drive the pulley 39. One of the gears 56 is connected by spur gears 57 to the driven shaft 58 of a transmission 59. The driving shaft 60 of this transmission is connected by spur gears 61 (Fig. 2) to one end of a counter-shaft 62 and the other end of the latter is connected by spur gearing 63 to the armature shaft 64 of an electric motor 65. The shaft 64 is connected by a belt 66 to drive fan 16.

Further detailed description of the construction, mounting and manner of driving the ordinary parts of the coating machine is thought unnecessary as these details are well known in the art and, moreover, are unnecessary to an understanding of the present invention.

The agitator 31 is pivotally mounted on shaft 50 and connected by a strap and rod 67 to an eccentric 68. The latter is mounted at one side of the casing A and is driven by spur gearing 68' from one of the rolls 44.

As is usual in coating machines, the interior of casing A is closed as far as possible and its interior is suitably heated, as by the electric heater conventionally shown at 69. An adjunctive electric heating device is shown at 70 in the supporting pedestal of casing A and air entering the pedestal and heated by element 70 can enter casing A by way of a passage 71. Cored passages 72 connect the upper part of tank 18 to the interior of casing A so that heated air, which is circulated by the fan, may reach the interior of the tank.

In operation, the confections are coated in the usual and well known way which will sufficiently appear from the foregoing description. The coating, however, is applied as soon as possible after its conditioning and as directly as possible to the confections. The coating is therefore applied at a time when it possesses the proper qualities of temperature, fluidity and homogeneity and the coating operation is thus performed under almost ideal conditions, which necessarily result in improved work.

The coatings applied to the confections also have an improved gloss and lustre due partly to these ideal conditions and partly to the method of treating the chocolate whereby it is successively subjected to the different temperatures, as above described. Due also to the chilling of the excess chocolate, which passes through the pervious conveyer 10, the cocoa butter content of the chocolate mixture is kept from separating and, as a practical matter, there is no time in the cycle of normal operation when the cocoa butter is allowed to separate. By reason of this arrangement a smaller percentage of cocoa butter can be used and result in equally as good work as effected by prior methods with a larger percentage of cocoa butter, because of the tendency with prior methods of the cocoa butter content to separate.

The invention has been disclosed herein for illustrative purposes but the scope of the invention is defined by the appended claims rather than by the foregoing description.

What I claim is:

1. The method of treating the coating material in a confection coating machine, which consists in first conditioning the coating, in applying it directly after conditioning to the articles to be coated, in reducing the temperature of the excess coating material not used in coating the articles; and in collecting such excess coating and returning it for reconditioning and subsequent application.

2. The method of treating chocolate in a confection coating machine which consists in causing it to travel through an endless path, in moving the confections so as to cross said path and become coated with some of the chocolate, in bringing the chocolate to a predetermined temperature at one point in said path prior to its application to said articles, and in lowering the temperature of such chocolate as is not used for coating the articles after it has passed beyond the same in said path and before it reaches said point.

3. The method of treating the chocolate in a confection coating machine, which consists in bringing it to a predetermined temperature, in thereafter applying it to the articles to be coated, in cooling the excess chocolate not used for coating to avoid separation of the cocoa butter therein; and in collecting and returning the cooled excess chocolate for subsequent reconditioning and application to articles to be coated.

4. The method of treating chocolate in a confection coating machine, which consists in first bringing it to a proper temperature condition, in flooding the articles to be coated with the chocolate directly after its conditioning, in collecting the excess chocolate not used on the articles and returning it for reconditioning and subsequent use for coating articles, and in cooling such excess chocolate to avoid separation of the cocoa butter content.

5. In a confection coating apparatus, means for bringing the coating to a proper predetermined temperature for coating. means for flooding the articles to be coated with a stream of the coating directly after its conditioning, means for collecting the excess chocolate from said flooding stream and returning it to the first named means, and means for cooling said excess chocolate before it is returned to said first named means.

6. In a confection coating machine, a supply tank for the coating arranged to deliver a stream of coating upon the articles to be coated, means for heating the coating in said tank and maintaining it at a predetermined temperature, pervious means for supporting the articles while subjected to said stream, means for cooling the coating passing through said pervious means, and means for returning the cooled coating to said tank.

7. In a confection coating machine, a supply tank for the coating arranged to deliver a stream of coating upon the articles to be coated, mixing means in said tank, means for heating the coating in said tank and maintaining it at a predetermined temperature, pervious means for supporting the articles while subjected to said stream, means for cooling the coating passing through said pervious means, and means for returning the cooled coating to said tank.

8. In a confection coating machine, a pervious means for supporting the articles to be coated, a vessel above said means to deliver a flooding stream of coating on said articles, a vessel below such means to collect the coating passing therethrough, means for returning the coating collected in the last named vessel and returning it to the first named vessel, and means for heating each vessel and maintaining the chocolate in the lower vessel at a lower temperature than that in the upper vessel.

9. In a confection coating machine, a pervious means for supporting the articles to be coated, a vessel above said means to deliver a flooding stream of coating on said articles, a vessel below such means to collect the coating passing therethrough, means for returning the coating collected in the last named vessel and returning it to the first named vessel, means for heating each vessel and maintaining the chocolate in the lower vessel at a lower temperature than that in the upper vessel, and means responsive to changes in temperature of the coating in each vessel to control the heating means thereof.

EMILE LOUIS ALFRED SAVY.